Nov. 24, 1970    H. S. MONTGOMERY    3,541,700
INSTRUCTIONAL DEVICE
Filed Nov. 19, 1968
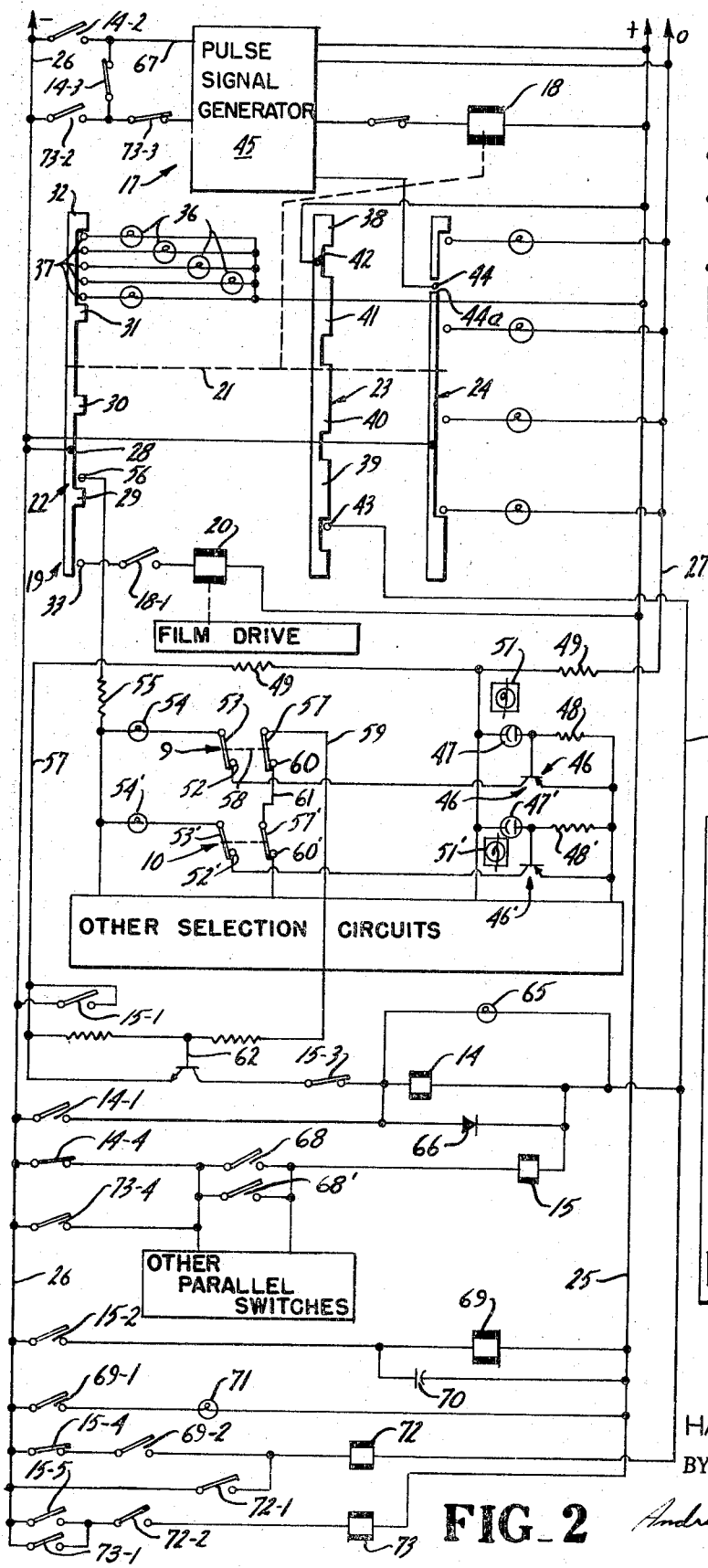
FIG_2
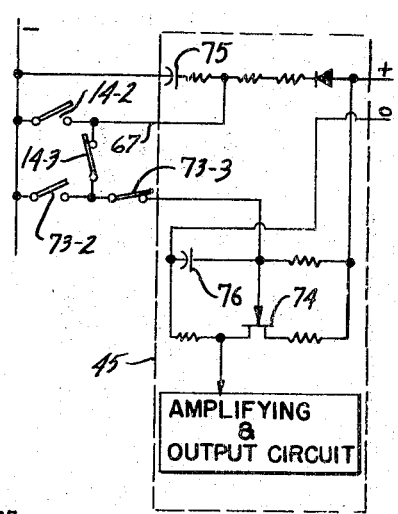
FIG_3
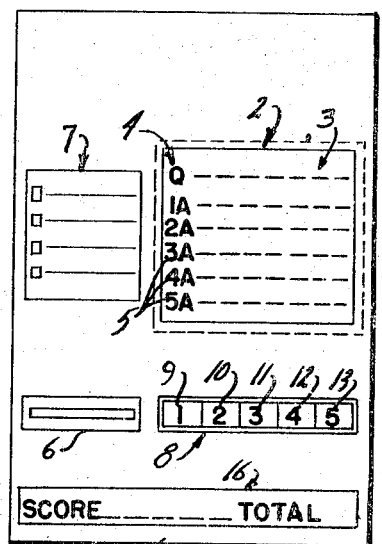
FIG_1
INVENTOR.
HAROLD S. MONTGOMERY
BY
Andrus, Sceales, Starke & Sawall
Attorneys United States Patent Office 3,541,700
Patented Nov. 24, 1970

3,541,700
INSTRUCTIONAL DEVICE
Harold S. Montgomery, Fox Point, Wis., assignor to Nutting Industries, Ltd., Milwaukee, Wis., a corporation of Wisconsin
Filed Nov. 19, 1968, Ser. No. 776,988
Int. Cl. G09b 7/08
U.S. Cl. 35—9
12 Claims

ABSTRACT OF THE DISCLOSURE

This disclosure relates to a multiple question and answer game which permits selection of two incorrect answers within an answer period before presenting a succeeding question. A first control relay is energized by closing a switch for an inserted correct response and actuates a drive relay to present the next question. A second control relay is energized by closing a second switch for a first incorrect response to set a third control relay for subsequent energization. If a second selection is correct, the first relay is operated to indicate the proper selection and actuate the program drive in the normal manner. If the second selection, however, is also incorrect, the second switch is again closed and energizes the third relay to indicate the wrong selection has again been made and actuate the program drive to present the next question.

---

This invention relates to an instructional device and particularly to such a device which submits stimulus information and related response information and permits selection of a proper response.

Within the mechanical teaching art, various devices have been suggested employing the presentation of stimulus information generally in the form of a question or questions and simultaneously presented a plurality of responses, one of which constitutes a proper response or answer. Such multiple choice question and answer type devices have been developed for classroom type presentation and as a game-type device to be placed in public establishment. In the latter, the customer inserts a proper coin or coins and is presented with a series of questions and answers. He selects an answer which may actuate a scoring means in accordance with the selection of proper and improper answers.

A particularly satisfactory game device has been marketed by the assignee of the present application under the trademark "I.Q. computer." In that device, the insertion of a coin or coins automatically conditions the system for operation in accordance with one of a plurality of subject categories which the player has previously selected through the operation of a suitable category selection means. The device stores a very substantial number of questions on a film strip for each of the categories, four of which are then presented in timed sequence. The device is constructed to automatically present a different set of questions and related answers for each category each time the game is played. Each question in any given series is presented for a predetermined time during which period the player can select any one of five possible presented answers by actuation of a related one of five answer push buttons. If a proper answer is selected, the player obtains a certain score and simultaneously a reinforcing response such as a visual lamp, a gong or the like. In response to an incorrect answer, a different light and sound is established. The player is allowed further chances or solutions with a reduced score until the predetermined time elapses.

The present invention is particularly directed to an improvement in such a device wherein the player or student is permitted only a certain preselected number of responses within any given time period to answer a given question. After the selected number of responses has been made, the score is the same as if no answer had been received and the program proceeds to the next question or bit of stimulus information. The player is informed prior to the operation of the device that he will have a certain number of chances to answer each question, and no more, before the device proceeds to the next step in the program sequence. Generally, a response means allows the player to select any one of the number of responses. A first control means responds to an inserted incorrect response to actuate a presentation means or other output means. A second control means responds to a first incorrect response to condition or set the second control means to actuate the presentation means or other output means upon receipt of a subsequent incorrect response. In a preferred construction, a switching system is interconnected between a response means such as answer selection means and the presentation means for the programmed presentation of the questions. The switching system is established to permit a pair of responses. If the first selection is a proper response, the device is actuated to indicate and record such response and to rapidly move to the next step in the program. If the first response, however, is an incorrect selection, the switching system establishes an interlocking ocntrol circuit to the drive system as well as providing an indication that an incorrect selection has been made. The first actuation of the interlock circuit, however, does not in any way change the normal program drive. If the second selection is correct, the system is operated to indicate the proper selection, to actuate the program drive in the normal manner and in addition to automatically reset the interlock circuit to standby. If the second selection, however, is also incorrect, the interlock circuit is now actuated through the same previous input to indicate that the wrong selection has again been made and that the program is being stepped immediately to the next step in the programmed sequence.

In a preferred construction, a sequential switching means forms a part of the second control means for actuation of a presentation means. The switching means include an incorrect response relay interconnected to the answer selection switches or other response means to be energized in response to an incorrect selection. This relay is interconnected with a first interlock relay to conjointly control a first try relay such that the latter is interlocked into the circuit in response to the selection of an incorrect response and a release of that selection. The first try relay in turn is interconnected to control, with the incorrect response relay, a fast step relay for the drive for the program. The initial selection of an improper response sequentially energizes the interlock relay and the first try relay which in turn conditions the circuit for the fast step relay. The second actuation of the incorrect relay then directly triggers and actuates the fast step relay and locks it into a drive circuit independent of the incorrect response relay. The first try relay and the fast step relay are interconnected in common to a power circuit through the program drive system such that they are momentarily disconnected and reset as the program steps from a given question to the next question position.

Applicant has found that the above circuit provides a highly reliable control system for restricting each player to a predetermined number of selections and thereby provides a further refinement in the operation of such an instructional or game device.

The drawing furnished herewith illustrates the best mode presently contemplated by the inventor for carrying out the invention and clearly discloses the above advantages and features as well as others which will be readily understood by those skilled in the art from the following description of the drawing.

In the drawing:

FIG. 1 is a diagrammatic illustration of a multiple choice question and answer device;

FIG. 2 is generally a schematic circuit diagram of a control system for carrying out the presentation of questions and answers in a programmed sequence in accordance with the present invention; and FIG. 3 is a fragmentary schematic diagram illustrating a portion of a generator shown in block diagram in FIG. 2.

Referring to the drawing, the present invention is particularly illustrated in connection with a multiple choice question and answer game. Generally, the game device includes a housing 1 within which the control and drive components are housed. Generally, the device includes a viewing opening 2 past which a film strip 3 is moved to present the stimulus and response information. As illustrated, a question 4 may be presented to the top of the opening with five possible answers 5 listed immediately below the question. The device may be provided with a coin input or receiver 6 adapted to receive one or more selected coins which are operative to turn on the device for the drive of the film strip 3 and the presentation of the question and answers 4 and 5 in a predetermined programmed sequence. Further, a category selection means 7 may be provided wherein the operator can select different general areas of information such as general knowledge, sports, movies or the like. In operation, the player would first actuate the category selection means 7 to determine the category within which the game or material is to be selected. Insertion of the coins into the receiver 6 automatically actuate the film drive for positioning the film strip 3 with respect to the viewing opening to present the desired category of information and particularly to present the first of a given number of questions, for example, four questions simultaneously with the presentation of the question and possible answers, a timing system is set up during which the player can select any one of the five possible answers 5 through the actuation of a player answer selection bank 8 which includes five push button switch units 9, 10, 11, 12 and 13, one for each of the possible answers. The push button switch units 9–13 are shown in FIG. 2 and, as more fully described hereinafter, the actuation of the proper answer pushbutton switch until 9–13 of the answer selection bank 8 actuates a correct response relay 14 which will drive the film strip 3 in a first mode to present a succeeding question. An improper selection, however, actuates an incorrect relay 15 to operate the device and particularly the movement of the film strip 3 in a different mode. The actuation of the correct and incorrect relays 14 and 15 may also be interconnected to a score presentation unit 16 which may have means to present the score for each question and the total or accumulated score for each game.

The correct relay 14 and incorrect relay 15 are interconnected through a special circuit connection such as shown in FIG. 2 in accordance with the present invention to actuate a pulse actuating section 17 which will control the sequencing of the program and particularly film strip 3 in response to the initial starting of the device. The pulse actuating section 17 is shown interconnected to provide timed pulsing of a stepped control relay 18 which in turn is interconnected to drive a program sequencer section 19 having a film projection control relay 20 connected in circuit therethrough.

Before describing the detail of the illustrated circuit of the invention, the program operation is summarized as follows:

One or more players insert the appropriate coin or coins into the input receiver 6 which establishes the proper program film or film portion 3 to the viewing opening 2.

The first question 4 and the associated answers 5 appear within the opening 2 and the player is allowed to select the proper answer by actuation of push button switch units 9–13 inclusive. A proper response results in actuation of the correct relay 14 which will simultaneously actuate the score accumulator 16 to indicate the score associated with the correct answer and simultaneously send a signal to the pulse actuating section 17 to increase the pulse repetition rate and thereby provide increased timed energization of the relay 18. This in turn results in a rapid drive of the sequencer section and an early energization of the control relay 20 to rapidly move the program to the second question.

Energization of the incorrect relay 15 as a result of selection of an improper answer does not result in any different actuation of the pulse actuating section 17 and the program thus continues in the normal manner. The player then has a chance to make a second selection. The second selection if it is still incorrect, is interlocked to provide a special signal to the pulse actuating section 17 which in turn drives the system including the sequencer section 19 in the same manner as the response of a correct energization of the correct relay 14.

More particularly, in the illustrated embodiment of the invention, the sequencer section 19 includes a stepping switch unit or assembly 21 coupled to and positioned by the relay 18. The illustrated unit 21 includes a question transfer contact strip 22, a power contact strip 23 and a correct-incorrect answer contact strip 24.

In an actual construction the stepping switches unit 21 will or may be suitable rotary type switch in which the contact strips are endless wafer-type elements which are rotated past a plurality of contacts. The strips are constructed with suitable conductive and non-conductive portions to make and break the circuits to the respective contacts. In the illustrated embodiment of the invention, the contact strips are shown in an expanded or developed view for purposes of simplicity and clarity of explanation.

The several contact strips 22–24 interconnect the various components to a power circuit which in the illustrated embodiment of the invention is a low voltage direct control system including a positive DC line 25, a negative DC line 26 and a reference line 27. For example, the incoming conventional alternating current power system can be interconnected through a suitable transformer and a rectifying system to provide the desired direct current voltage providing zero volts at reference line 27, a positive 12 volts at positive line 25 and a negative 12 volts at negative line 26.

The question and transfer contact strip 22 is connected to the negative power line 26 through a negative power line contact 28 and associated lead. The contact strip 22 is formed with four equispaced contact projections or off-step portions 29 through 32, and thus defines along the one edge alternately conductive and non-conductive portions. The conductive 29–32 portions are relatively small and correspond to a single step of the switch. The non-conductive portions are relatively large generally corresponding to six steps of the switch 21. A positive power line contact 33 is aligned with the 4 equispaced projections 29–32 and in maximum spaced relation to the contact portion 29. The film projection control relay 20 is connected in series between the contact 33 and the positive power line 25 with a set of normally open contacts 18–1 of the stepping control relay 18. Each time the stepping relay 18 is energized, it moves the contact strip one step with the distance between projections being related to six steps in the illustrated embodiment of the invention. Thus the stepping relay 18 must be positively actuated six times before the contact is connected to the first power projection 29. Only at that time will the simultaneous interengagement with the contact strip 32 and the closing of the contacts 18–1 result in the energization of the film strip control relay 20. Under normal operation, the player has the time established by the sequential six steps to select a proper answer in the system and have it properly recorded.

In the illustrated embodiment of the invention, each step established reduces the available score which can be recorded on the score accumulator 16. The player is informed of each step and the remaining possible score through a plurality of score indicating lamps 36 each of which is separately connected between the reference power line 25 and one of a plurality of contacts 37 which are mounted in alignment with the projection 29–32 and spaced from each other in accordance with one step of the contact strip 22. Thus, as the contact strip 22 moves downwardly in the illustrated embodiment of the invention, the uppermost contact porjection 32 first moves into engagement with a contact 37 related to a lamp 36 indicating a maximum score, for example, 200 points. The next step establishes contact with the adjacent contact 37 connected to energize a reduced score indicating lamp 36; for example, related to 150 points. This continues until the last possible step, at which time an answer lamp, as subsequently described, is illuminated to identify the proper answer, indicate that no possible points are available and that the program is proceeding to the next question.

The movement of the contact strip 22 is directly interrelated and moved in synchronism with the power contact strip 23. The contact strip 23 is generally constructed similar to that of contact strip 22 and includes 4 equi-spaced contact projections 38–41 defining alternate conductive portions of a five step length and non-conductive portions of a two step length along the right edge of the contact strip. The contact strip 23 is connected by a positive power contact 42 and associated line directly to the power line 26. A power transfer contact 43 is disposed to one side of the projection 39 such that the first step connects power to contact 43. The contact 43 is connected via a transfer power line to provide power to the relay control circuitry actuated by the push button switch units 9 through 13 inclusive for actuating the correct relay 14 and the incorrect relay 15.

The contact strip 24 is connected in to the negative power line 26. The contact strip 24 is also provided with a disconnect contact 44 aligned with an interrupted portion 44a along the left-hand portion of the strip 24 and to the input of a pulse signal generator 45 forming a part of the pulse actuating section 17.

The pulse signal generator 45 is connected to drive the stepping control relay 18.

The generator 45 which may be any suitable pulse forming means is preferably a solid state pulsing unit which is adapted to produce a pulse of a predetermined duration at given intervals. For example, the game device manufactured and sold by the assignee of this application employs a solid pulser unit which produces a pulse of .12 seconds length at given intervals which is automatically related to an RC constant for adjusting the interval between 2 second and 6 seconds. Normally, the pulses will be established every 6 seconds and each is operable to energize the relay for a corresponding period and establish one step of the contact strips 22–24. The accelerated stepping is established when a correct answer or a pair of incorrect answers has been inserted. The accelerated stepping action is controlled by the selective energization of the relay 14 and 15 in response to the actuation of the push button switch units 9 through 13 inclusive which form a part of the answer selection system 8.

Each of the push button switch units 9 through 13 inclusive is connected through similar response circuits or proper control of relays 14 and 15. The response circuits associated with the push button switch units 9 and 10 are shown in detail with the others shown in block diagram. Further, only the circuit associated with push button switch unit 10 are identified by corresponding primed numbers.

The response circuit associated with push button switch unit 9 includes a transistor 46 shown as a PNP-type transistor having its base interconnected to the junction of a photocell 47 and a resistor 48. A voltage dividing network including a pair of resistors 49 are connected between the reference voltage line 27 and an input line 57 which is connected through a set of normally closed contacts 15–1 of the incorrect response relay 15 to the ngative power line 26. The series connected photocell 47 and resistor 48 are connected across the one voltage dividing resistor 49 to establish an input voltage to the transistor as long as the contacts 15–1 are held closed. The emitter of the transistor 46 is connected to the reference voltage line 27 and the collector is connected to the push button switch unit 9 for selectively connecting the collector in a power and signal circuit, as presently described.

A lamp 51 provided for energizing of the photocell 47 and all of the other related corresponding photocells of the system. The film strip 3 may include suitable control apertures transmitting light only to the photocell 47 associated with the correct answer. In the absence of illumination of the photocell 47, the transistor 46 is biased off. Illumination of the photocell 47 establishes a biasing voltage at the base of the transistor 46 causing it to conduct or switch on. Only the transistor associated with the correct answer push button switch unit 9–13 is turned on and power is applied to only the corresponding push button switch unit.

The push button switch unit 9 includes a plurality of switches, a first of which includes a contact 52 connected to the collector and a movable pole or arm 53 connected to a correct answer lamp 54 such that in the standby position, the energization of a transistor 46 applies reference power to the one side of the associated lamp 54. The opposite side of the lamp is interconnected through a coupling resistor 55 to a contact 56 alined with the projections of the question transfer contact strip 22. The contact 56 is disposed in maximum spaced relation to a contact 30 of the strip 22 in the initial starting position. As the contact strips 22–23 are driven through the cycle for a question, immediately prior to the presentation of the next succeeding question, the interengagement of the contact 56 with the projection 30 energizes the lamp 54 to indicate to the player what the correct answer was. Thus, even if the correct answer is not triggered by proper selection of the push button switch unit 9 the player is informed of the correct answer and thus provided with additional information.

The push button switch unit 9 includes a second switch having a common pole or arm 57 coupled to the common pole 53 as shown by dotted line 58. A signal line 59 is connected to the pole 57 and provides a signal input to the relay control circuitry. The arm 57 normally engages a contact 60 connected to a series interconnecting signal line 61 which is connected to the common pole 57' in switch unit 10. Thus, all of the second switches in the normal position of the several push button switch units 9 through 13 are connected in series with each other to provide a signal circuit to the common signal line 59. This provides an interlock whereby only one of the push button switch units 9–13 can be properly operated at any given time unless the correct push button is actuated and precedes the incorrect push button in the circuit connection. If proper and improper buttons are actuated, an incorrect one in the preceding portion of the series circuit will break the signal line circuit and prevent transfer of an energizing signal via the line 59 to the relay control circuit.

The relay control circuit generally includes an input transistor 62 shown and NPN-type transistor connected in a common emitter configuration. The base of the transistor 62 is connected to signal line 59 and to the negative power line 26 through the normally closed contacts 15–1 of the incorrect response relay 15. The emitter to collector circuit is connected to the line 57 and in series with the correct response relay 14 to a power transfer line 64 which is interconnected to the power transfer contact 43 of the contact strip 23. After the initial start step which initiates a cycle of operation, power is maintained on the branch path of correct relay 14 during the following five steps to permit operation of the correct answering relay during the interval of time allotted for answering a given question. Correct answer lamp 65 is connected in parallel with the winding of relay 14 to provide for simultaneous energization. A protective diode 66 is shown connected in parallel with the relay in accordance with the well known practice. When the correct answer or response relay 14 is energized, it simultaneously informs the operator that the correct answer had been given and controls the following drive circuit.

The correct answer relay 14 first includes a set of normally open latch contacts 14–1 which are interconnected directly between the negative 12-volt power line 26 and the corresponding terminal of the relay 14. Once relay 14 is energized, it is latched into the circuit and is only dropped out as a result of the movement of the contact strip 23 to break the circuit from the positive power line 25 to the power transfer line 64.

The correct response relay 14 includes a second set of normally open contacts 14–2 and a set of normally closed contacts 14–3 connected in series between a fast step input line 67 and the negative power line 26 to the pulse signal generator 45. When the relay 14 is energized and opens the contacts 14–3, it changes the RC constant of the pulse generator 45 to increase the pulse repetition rate and thereby provide for a more rapid energization and de-energization of the stepping control relay 18 and thereby rapidly transfers the several strips 22–23 through their cycle. The final step of strip 22 operating the film control relay 20 to present the following question and the final step of strip 23 resetting the relay 14. The closing of contacts 14–2 resets the timing circuit to insure that the first step in the next cycle is a full slow step.

Relay 14 includes a third set of normally closed contacts 14–4 which are connected in series with the relay 15 to prevent operation thereof with the relay 14 actuated.

The incorrect response relay 15 is connected between the power transfer line 64 and the negative power line 26 in series with the normally closed contacts 14–4 and a third switch 68 of the switch unit 9. In addition, each of the other switch units 10 through 13 includes a corresponding switch which is connected in parallel with each other and with the switch 68. Consequently actuation of any push button switch unit 9–13 closes an associated switch 68 to provide power between the normally closed contacts 14–4 of relay 14 and the relay 15. Consequently, if an incorrect response has been inserted, relay 14 remains de-energized and power is applied to the relay 15.

The relay 15 includes contacts 15–1 which control power to the circuit of switch units 9–13 and a second set of normally open contacts 15–2 connected in series with an interlock relay 69 directly across the negative and positive power lines 25–26. Contacts 15–3 are connected in series with relay 14 to prevent energization at this time. A parallel holding capacitor 70 is connected in parallel with the interlocking relay 69 and maintains the relay 69 energized for a short period following the opening of the contacts 15–2.

The interlock relay 69 includes a set of normally open contacts 69–1 connected in series with an incorrect answer lamp 71 directly across the power lines 25–26. In addition, a visual or an audible alarm, not shown, may be connected to simultaneously provide a visual and audible indication of the insertion of an incorrect response into the circuit.

The interlock relay 69 also includes a set of normally open contacts 69–2 connected in circuit with a first try relay 72 to the power line 26 and the transfer line 64. A set of normally closed contacts 15–4 of the incorrect response relay 15 are connected between the power supply line 26 and contacts 69–2. This requires that the relay 15 be de-energized while the relay 69 is energized in order to complete the circuit to the first try relay 72. This condition is established as the interlock relay capacitor 70 is charged by the energization of the relay 15 and relay 69 remains energized after the release of relay 15 as a result of the capacitor charge. There will therefore be a time period during which both relays 15 and 69 are energized.

The first try relay 72 includes a set of normally open latch contacts 72–1 which are connected in parallel with a series connection of the relay contacts 15–4 and 69–2. After the initial energization of the relay 72 therefore, it is maintained energized through the contact 72–1 and the power transfer line 64 until such time as the stepping switch moves to remove power from the power transfer line 64, at which time the relay resets.

The first try relay 72 is interconnected into the circuit to condition an incorrect response fast step relay 73 into the circuit for subsequent operation if a second incorrect response is inserted.

The fast step relay 73 has its one side connected to the negative power supply line 26 in series with a set of normally open contacts 72–2 of the first try relay 72 and a set of normally open contacts 15–5 of the incorrect response relay 15. The opposite side of the relay 73 is connected directly to the positive power supply line 25. As previously noted, the first insertion of an incorrect answer results in the closing of the contacts 72–2 and these contacts will be held in as a result of the continuous energization of relay 72. If the second selection is also in error, the contacts 15–5 will be closed to establish in circuit through the relay 73.

This relay includes a first set of normally open latch contacts 73–1 connected directly in parallel with the incorrect relay contacts 15–5. Consequently, the initial energization closes the latch contacts 73–1 to maintain energization of the relay 73 until the first try relay contacts 72–2 open.

The incorrect fast step relay 73 includes a second set of contacts 73–2 connected between the negative power supply line 26 and the fast step input line 67 and a set of normally closed contacts 73–3 in the fast step input line 67 to the generator 45. The normally open contacts 73–2 are connected to the reset line 45a of pulse signal generator 45 through the normally closed contacts 14–4 of the fast step relay 14. The opening of contacts 73–3 changes the time constant to provide a rapid pulse output and the closing of contacts 73–2 insures reset such that at the end of the rapid stepping the next succeeding step is a full slow step.

Thus, energization of either the correct answer relay 14 or the incorrect fast step relay 73 results in a corresponding change in the RC time constant of the pulse signal generator 45, with a resulting acceleration of the pulse signals as a result of the reduction in the time interval between the pulse signals.

Referring particularly to FIG. 3, a suitable input control circuit for a unijunction transistor controlled pulser is shown including a unijunction transistor 74 connected to produce a pulsed output controlling a suitable amplifying and coupling circuit, not shown. The illustrated circuit includes a pair of timing capacitors 75 and 76 connected to control the firing of the unijunction transistor with the timing capacitor 75 selectively inserted and removed by the normally closed contacts 14–3 and 73–3. In the normal pulsing state, contacts 14–3 and 73–3 are closed and interconnect the circuit of capacitor 75 to the transistor 74. If either set of contacts 14–3 or 73–3 opens, the path is broken and transistor 74 is actuated by only capacitor 76 with an increased output rate. The normally open contacts 14–2 and 73–2 provide a path across the capacitor 75 to reset the capacitor whenever the contacts 14–3 or 73–3 open.

Relay 73 further includes a fourth set of normally open contacts 73–4 connected in parallel with contacts 14–4 in the circuit relay 15. The contacts 73–4 maintain energization of the incorrect response relay 15 until such time as the circuit is broken through the power transfer line 64. The stepping control relay 18 is accelerated either in response to the insertion of a correct answer or the insertion of two sequential incorrect answers to activate the drive for presenting the next question and plurality of answers. The final step of strips 22–23 not only present the next question but resets the relay circuitry via the momentary break between strip 23 and contact 43 to return the system to normal drive and to again accept input via switch units 9–13.

The operation of the illustrated embodiment of the invention is summarized as follows:

The player inserts the necessary coin or coins into the input receiver 6 after having made the category selection. The film strip 3 is automatically driven to present the first question in a series with the associated five answers. This initial actuation through the coin insert energizes the stepping relay 18 once to establish the first step and the interconnection of the various power lines 25–27 to the circuit strips 22–23 to permit indication and response with respect to the push button selection. If a proper push button unit is actuated, the signal is transferred through the second switch arm 57 of the push switch unit to the signal line 59 to apply power to the base of the input transistor 62. This results in the energization of the correct answer relay 14 through the power transfer line 64. The correct answer relay 14 locks in through its set of normally open contacts 14–1 and simultaneously accelerates the operation of the signal pulse generator 45 through the opening of the associated contacts 14–3. The circuit is maintained until contact strip 23 moves the contact projection 39 past the power transfer contact 43 and aligns it with the following non-conductive portion of the circuit. The circuit to the correct answer relay 14 is broken and the circuit resets with the pulse signal generator 45 reverting to the normal time sequence and moves through two additional steps to again reconnect the power transfer line 64 to the relay circuitry and to simultaneously present the second question and multiple answers.

If all correct answers are given, the whole system sequences in this manner to provide rapid movement of the system between the correct answers and the presentation of the next question.

If no answer is given the system steps through the first time allotted for answering the question. Just before the final step, the power contact 56 associated with contact strip 22 engages the conductive contact projection 30 to provide power through the correct answer recognition lamp 54, the normally closed first switch arm 53 and contact 52 of the push button switch 9 and the then conducting transistor 46.

The second question is then presented to the player.

If an incorrect push button unit 9–13 is actuated, the common arm 57 is connected to an essentially dead contact 52 and consequently, no signal is applied to the input transistor 62 and the correct answer relay remains de-energized. However, the simultaneous closing of the associated third switch 68 of the unit 9–13 energizes the incorrect response relay 15. Relay 15 first energizes the timed interlock relay 69 which closes the contacts 69–1 to energize the incorrect answer lamp 71 to indicate to the player that he has made an incorrect response. It also results in an initial closing of the normally open contacts 69–2 to the first try relay 72. While the push button is held down, the first try relay 72 is maintained de-energized as a result of the normally closed contacts 15–4 of the incorrect response relay 15. When the operator releases the push button switch unit 9–13 to again insert a second response, the normally closed contacts 15–4 revert to their normal condition and complete the path to the first try relay 72 through the normally open contacts 69–2 of the interlock relay 69, the contacts 69–2 of which remain closed as a result of the timing capacitor 70. Relay 72 latches in via contacts 72–1 and closes the normally open contacts 72–2 and the circuit of the incorrect fast step relay 73 to set or condition relay 73 for operation.

If the second input is correct, the system operates as previously described to respond to a correct answer.

If the second step answer is incorrect, the incorrect relay 15 closes contacts 15–5 and relay 73 is energized and then latched in through its normally open latch contacts 73–1 to maintain energization thereof until the first-try relay 72 drops out to open the normally open contacts 72–2. The incorrect fast step relay 73 opens its normally closed contacts 73–3 in the circuit of the pulse signal generator 45 to result in an accelerated transfer of the sequence control.

In summary, during the operation of the system, an allotted time is provided during which a player may answer each question. During such time he may insert the correct answer or two incorrect answers. Occurrence of either results in an operative disconnect and rapid acceleration of the system to the next step. In the illustrated embodiment of the invention, the score reduces only with time. In the illustrated embodiment of the invention, the pulse signal generator 45 was assumed to establish one pulse signal every six seconds. If the player should push two buttons within six seconds, he can, of course, insert an incorrect answer and a correct answer and get full score. If in excess of six seconds is taken to select the correct answer, the score will progressively decrease. Alternatively, of course, the score will progressively decrease. Alternatively, of course, the score can be made independent of time and dependent on the number of chances required to obtain a correct answer, with a certain score if a correct answer is given immediately and a different score if an incorrect answer is first given and then followed by a correct answer.

Further, although described in a system permitting only two incorrect answers, the system could be extended by the inter-connection of sequencing circuits to permit more than one incorrect answer.

The present invention provides a novel apparatus and control for a multiple choice instructional device.

Various modes of carrying out the invention are contemplated as being within the scope of the following claims particularly pointing out and distinctly claiming the subject matter which is regarded as the invention.

I claim:

1. An instructional apparatus having presentation means for presenting stimulus information and having a response means for selecting one of a plurality of possible responses to such stimulus information, comprising first control means actuated in response to a correct response to produce a first output signal, and second control means actuated in response to insertion of a plurality of incorrect responses to produce a second output signal, said second control means including interlocking means requiring sequential spaced actuation whereby said second control means requires a predetermined number of sequential actuations before the second control means is operative to produce the second output signal.

2. The instructional apparatus of claim 1 having a variable speed drive system for sequentially presenting said stimulus information at a predetermined spaced time sequence, said first control means being coupled to actuate said drive to vary the speed of the variable speed drive system and to accelerate the time of presenting a succeeding question in response to said first output signal and said second control means being similarly interconnected to control said drive system to accelerate the presentation of a succeeding piece of stimulus information in response to said second output signal.

3. The instructional apparatus of claim 1 wherein said second control means includes an input means controlling a timed first switching means, a second switching means conjointly actuated by the first switching means and the input means, an accelerating switching means conjointly controlled by the input means and the second switching means and requiring sequential spaced actuation of the input means to complete a circuit through said second switching means whereby said response means requires a pair of sequential actuations before the accelerating switching means is operative.

4. The instructional apparatus of claim 3 having a timed drive system for sequentially presenting said stimulus information in a predetermined spaced time sequence, said first control means being coupled to actuate said timed drive system to accelerate the time of presenting a succeeding question in response to said first output signal and said second control means being similarly interconnected to control said drive system to accelerate the presentation of a succeeding piece of stimulus information in response to said second output signal.

5. The instructional apparatus of claim 1 including timed drive means for sequentially presenting said stimulus information and to automatically indicate a correct response identification at the terminal end of each period and immediately prior to the presentation of a succeeding question.

6. The instructional apparatus of claim 1 having a timed drive means for sequentially presenting the questions in a predetermined timed spaced relation and scoring means associated with said timed drive means to vary the score in response to the elapsed time between the presentation of the question and the insertion of a correct answer.

7. The instructional apparatus of claim 2 including means operative during a given maximum response period for responding to a question to reduce the score associated with a correct answer.

8. The instructional apparatus of claim 1 wherein said response means includes a signal line and establishes a signal at the signal line in response to actuation of a correct response, said first control means including a correct response switching means connected to said signal line and actuated in response thereto and interconnected to actuate the presentation means to immediately present a succeeding question, an incorrect response switching means connected in circuit through a plurality of input switching means of said response means, each of said input switching means being related to one of each of the possible responses, a timing switching means connected in circuit by said incorrect response switching means and having a predetermined time out maintaining a circuit path for a predetermined time after de-energization thereof, an initial-try switching means interconnected in circuit by the incorrect response switching means and the timing switching means, said initial-try switching means having latching means to maintain itself actuated in response to an initial actuation thereof, an incorrect drive switching means connected in a circuit by the initial-try switching means and the incorrect response switching means and only energized in response to the sequential energization of the incorrect response switching means, said incorrect drive switching means having latching means to maintain itself and having contacts connected to the presentation means to immediately present a succeeding question, and power transfer means interconnected into the circuit of said initial-try switching means and actuated by the presentation means to momentarily remove power from such initial-try switching means to reset said initial-try switching means prior to the presentation of the succeeding question.

9. The instructional apparatus of claim 8 wherein the response means includes electrically operated elements, and said incorrect response switching means is interconnected in the circuit of said response means to remove power from the response means during actuation of the incorrect response switching means.

10. The instructional apparatus of claim 1 having a plurality of switching circuits one for each of the possible responses, said switching units including means to establish a signal in response to actuation of a correct answer switch unit, said first means including a correct response relay connected to said signal line and actuated in response thereto having contact means interconnected to actuate the drive means to increase the program presentation to imediately present a succeeding question, an incorrect response relay connected in circuit through a plurality of means one of each of which is associated with each of the input switch units, an interlock relay actuated by the incorrect response relay having a predetermined time out to maintain its contacts in an energized state for a predetermined time after de-energization thereof, a first-try relay interconnected in a power circuit with contacts of the incorrect response relay and the timing interlock relay whereby the first try relay is only energized in response to the sequential energization and de-energization of the incorrect response relay, said first-try relay having the latching means to maintain energization thereof in response to the initial energization, an incorrect response fast-step relay connected in circuit through contacts of the first-try relay and the incorrect response relay whereby said incorrect fast-step relay is only energized in response to the sequential energization of the incorrect response relay, said incorrect fast-step relay having contact means to by-pass the associated contacts of the incorrect response relay in the energizing circuit of the incorrect fast-step relay and having contacts connected to the drive means to accelerate the drive means and thereby immediately present a succeeding question, and power transfer means interconnected into the circuit of selected relays and actuated by the timed drive means to momentarily remove power from said selected relays at the terminal end of each time period to reset said selected relays prior to the presentation of a succeeding question.

11. The instructional apparatus of claim 10 wherein said incorrect response relay includes control contacts interconnected to remove power from the input switch units in response to actuation of the incorrect response relay.

12. The instructional apparatus of claim 10 wherein the fast-step relay includes latching contacts interconnected in parallel with the switches of the input switch means connected in circuit to the incorrect response relay to maintain such incorrect response relay energized through said power transfer means.

References Cited

UNITED STATES PATENTS

| | | | |
|---|---|---|---|
| 3,300,875 | 1/1967 | Nisbet | 35—9 |
| 3,376,657 | 4/1968 | Dorsett | 35—9 |

WILLIAM H. GRIEB, Primary Examiner